US00RE50889E

(19) United States
(12) Reissued Patent
Tooker et al.

(10) Patent Number: US RE50,889 E
(45) Date of Reissued Patent: May 12, 2026

(54) SYSTEM AND METHOD FOR TRACKING AN OBJECT

(71) Applicant: TECHNOLOGY SERVICE CORPORATION, Arlington, VA (US)

(72) Inventors: Marcus Tooker, Wilmington, NC (US); Travis Worrick, Plymoth, MA (US); Chris Kluckhuhn, Forestdale, MA (US); John Patrick Farrell, Woodbridge, VA (US); Ryan Kowalske, Hudson, MA (US)

(73) Assignee: Technology Service Corporation, Arlington, VA (US)

(21) Appl. No.: 18/953,961

(22) Filed: Nov. 20, 2024

Related U.S. Patent Documents

Reissue of:

(64) Patent No.: 11,538,348
Issued: Dec. 27, 2022
Appl. No.: 16/438,264
Filed: Jun. 11, 2019

(51) Int. Cl.
*G08G 5/72* (2025.01)
*G01S 19/13* (2010.01)
*G01S 19/51* (2010.01)

(52) U.S. Cl.
CPC ..... *G08G 5/727* (2025.01); *G01S 19/13* (2013.01); *G01S 19/51* (2013.01)

(58) Field of Classification Search
CPC ..... G08G 5/727; G08G 5/0082; G01S 19/13; G01S 19/51; H04W 84/005; H04W 84/18; H04B 7/18504; H04B 7/18506
See application file for complete search history.

(56) References Cited

U.S. PATENT DOCUMENTS 5,829,315 A * 11/1998 Polowchak ..... G05G 5/06 74/471 R
2015/0116155 A1* 4/2015 Chibane ..... H01Q 3/08 342/372
2019/0373173 A1* 12/2019 Wang ..... B64C 39/024

FOREIGN PATENT DOCUMENTS

WO WO-2018090258 A1 * 5/2018 ..... H04N 5/23203
WO WO-2018152773 A1 * 8/2018 ..... H04N 23/63

OTHER PUBLICATIONS

English translation of WO-2018090258-A1 (Year: 2018).*
"Avwatch Mobile Tracking Antenna System Directional," retrieved from Mar. 30, 2019 capture, https://web.archive.org/web/20190330194306/http://avwatch.US/mobile-tracking-antenna-system.
"The Avwatch Mobile Tracking System," published Aug. 21, 2018.

* cited by examiner

*Primary Examiner* — Eric B. Kiss
(74) *Attorney, Agent, or Firm* — Dunlap Bennett & Ludwig PLLC

(57) ABSTRACT

A mobile tracking system including an antenna, gimbal, and GPS subsystem. The mobile tracking system is operable with a plurality of models of gimbal and can automatically determine gimbal parameters based upon a detected model. This allows for plug and play of several gimbal models without the need for further input provided by a user. The mobile tracking system can also identify positional information for the system itself as well as for a tracked node, and can provide gimbal pan/tilt instructions based upon both.

(Continued)

This allows for accurate tracking in an environment where the MTS itself is moving.

15 Claims, 5 Drawing Sheets

SYSTEM AND METHOD FOR TRACKING AN OBJECT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 11,538,348. The reissue applications are application Ser. No. 18/953,961 (the present application); and application Ser. No. 19/400,355, which is a divisional reissue of U.S. Pat. No. 11,538,348.*

FIELD OF THE INVENTION

The present disclosure relates to a system and method for tracking an object.

BACKGROUND OF THE INVENTION

Certain prior art systems suffer three main disadvantages: setup location, complexity of components and overall assembly time.

First, a tracking system is rarely set up in proximity to where the received data's final destination. Often, a tracking system goes on top of a nearby mountain or on the roof of the highest nearby building, and the data is routed down to a lower location where the end user ultimately receives the live data. These locations are usually difficult to get to, whether it be hiking up a hillside or climbing up an enclosed ladder. Tracking antennas will always perform better at these types of locations with a higher vantage. If the overall size of the tracking system were to be smaller and more manageable, setup would be simpler and ultimately faster for the end user.

Second, the number of components associated with older and larger tracking systems was a huge source of frustration. There are roughly 60 individual parts including nuts, bolts and critical items like RF cables, feedhorns and a parabolic dish that all break down into multiple pieces.

Finally, overall assembly time was a huge limiting factor, especially in an ever changing environment. By design, MANETs are rapidly deployed to support highly dynamic mission requirements. Current tracking systems take 1 to 2 people roughly 30-45 minutes to set up. This was often unacceptable or unrealistic given mission requirements.

SUMMARY OF THE INVENTION

The present disclosure overcomes the disadvantages of the prior art by providing a mobile tracking system (MTS) that successfully enables Mobile Ad Hoc Networking (MANET) radios to carry 1 Mbps out to 132 miles. With proper radio settings and a clean RF environment, up to 30 Mbps at 30 miles and 15 Mbps at 60 miles are achievable. Further, the present system is modular and includes as few as 2 pieces out of the box. This provides unparalleled value to an end user. Finally, initialization of the present system takes only approximately 3 minutes to initialize and is fully operational.

Advantageously, the MTS can be lightweight and have a small form factor. The MTS needs only minimal mechanical setup required, can provide automatic heading calculation, and has a radio agnostic, modular design; allowing for hot-swapping of radios in seconds. The MTS can include an integrated Inertial Navigation System (INS), built-in gimbal stabilization, and can be Cursor on Target (CoT) compatible. The MTS can include a web-based Graphical User Interface (GUI) and can be compatible with Single Input, Single Output (SISO) and Multiple Input, Multiple Output (MIMO) networks. Further, the MTS need not be static like tracking systems of the prior art. With the INS and Gimbal Stabilization, the MTS has the capability to be used in maritime and vehicular environments without RF degradation or attenuation during pitch and rolls.

One aspect of the disclosure provides a mobile tracking system, comprising: an antenna configured to track an object; a gimbal configured to control at least one of a pan or tilt associated with the antenna; a GPS module configured to identify a position of the mobile tracking system; a processor configured to determine a model type of the gimbal and, responsive to the determined model type, determine one or more gimbal parameters specific to the determined model type.

In one example, the antenna comprises a dish or satellite dish.

In one example, the system further includes a radio.

In one example, the gimbal comprises one of a first gimbal unit or a second gimbal unit, the first gimbal unit having gimbal parameters that are distinct from the second gimbal unit.

In one example, the gimbal parameters are a number of positions per degree.

In one example, the first gimbal unit or the second gimbal unit can be swapped in the mobile tracking system without further user input.

In one example, the system further includes a frame configured to receive at least one of the antenna, gimbal, GPS module, or processor.

In one example, the frame is mounted to a mounting object, comprising at least one of a stationary mounting object or a moving mounting object.

In one example, the object comprises at least one of a helicopter, airplane, or unmanned aerial vehicle.

Another aspect of the disclosure provides a method of tracking an object using a mobile tracking system, comprising: receiving a position information for an object to be tracked, comprising at least one of GPS coordinate or heading; determining position information for the mobile tracking system, comprising at least one of GPS coordinate or heading corresponding to the mobile tracking system; determining a type of gimbal associated with the mobile tracking system; determining at least one gimbal parameter corresponding to the determined gimbal type; moving an antenna, via the gimbal, based upon the position information for the object, the position information for the mobile tracking system, and the at least one control parameter.

In one example, the gimbal comprises one of a first gimbal unit or a second gimbal unit, the first gimbal unit having gimbal parameters that are distinct from the second gimbal unit.

In one example, the gimbal parameters are a number of positions per degree.

In one example, the mobile tracking system is mounted to a moving object.

In one example, the method further includes swapping the first gimbal unit with the second gimbal unit without further user input to the mobile tracking system.

In one example, the object comprises at least one of a helicopter, airplane, or unmanned aerial vehicle.

BRIEF DESCRIPTION OF THE DRAWINGS

The invention description below refers to the accompanying drawings, of which.

DETAILED DESCRIPTION

Figure 1:
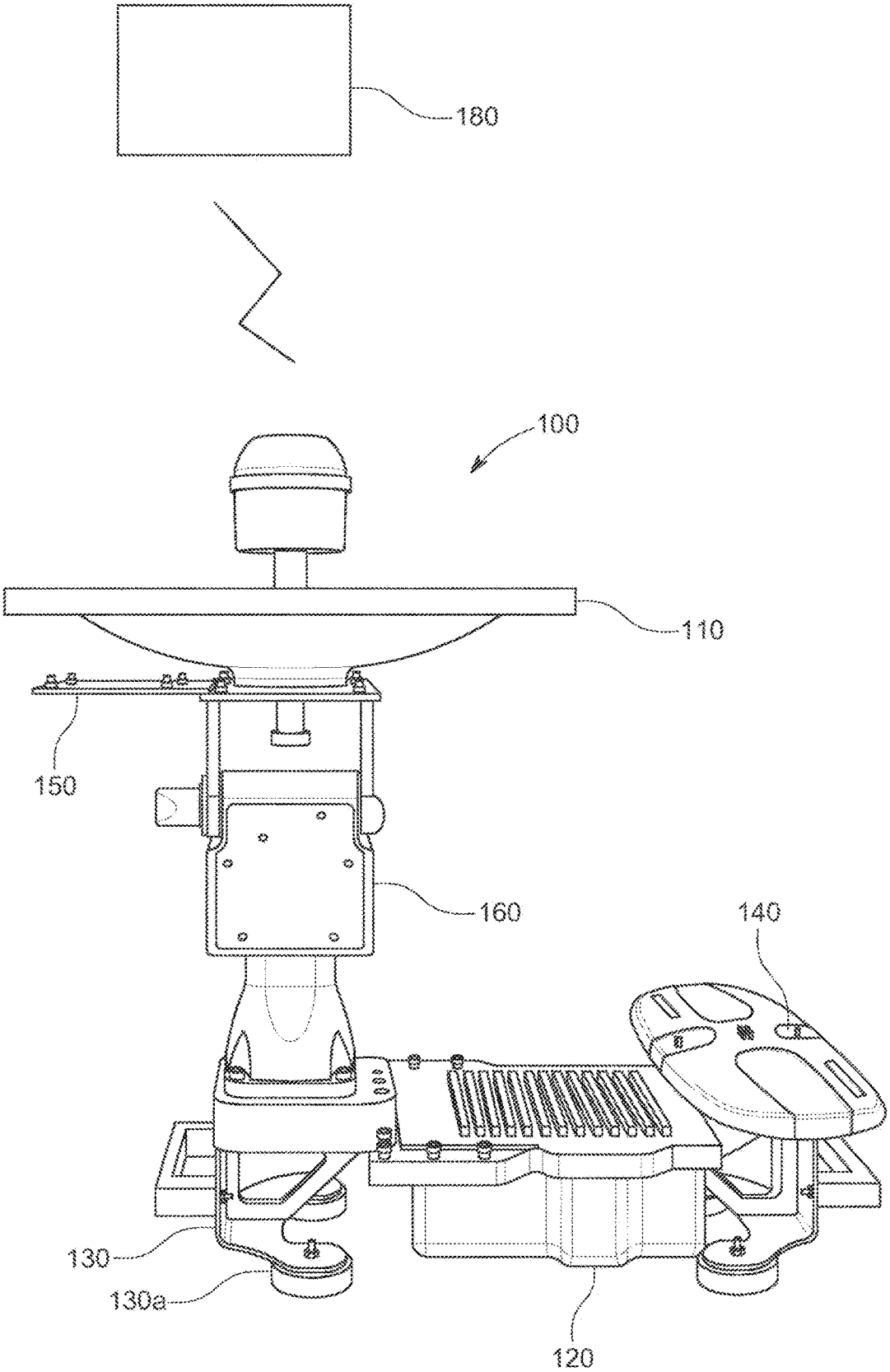
FIG. 1 is a perspective view of a mobile tracking system according to one or more aspects of the disclosure.

FIG. 1 is a perspective view of system 100 for tracking an object 180 (also referred to as a target node) according to one or more aspects of the disclosure.

As shown, the mobile tracking system (MTS) 100 can include one or more subcomponents, such as an antenna 110, a main computer 120, a frame 130, a GPS module 140, an optional radio mount 150 and gimbal 160.

The antenna 110, main computer 120, GPS module 140, optional radio mount (not shown) capable of attaching to optional radio mount 150, and/or gimbal 160 can be attached permanently, semi-permanently, removably, directly, or indirectly to a frame 130, with the frame having one or more mounting brackets 130a for mounting the system 100, such as to a moving mounting object (e.g., moving vehicle), stationary mounting object (stationary vehicle), etc. The frame 130 can be made of a polymer, a metal, or any combination thereof. The system 100 overall can weigh approximately 40 pounds and have a height of approximately 24 inches to 48 inches.

The antenna 110 can be any type of antenna (e.g., satellite dish or dish) capable of tracking an object 180, such as a MIMO 18 dBi 2.4 GHz.

The main computer 120 can include a processor, a memory, and any other components typically present in general purpose computers. The memory may store information accessible by the processor, such as instructions that may be executed by the processor or data that may be retrieved, manipulated, or stored by the processor. In one example, the processor and memory can within the same main computer 120, while in other examples it is understood that the processor and memory may respectively comprise one or more processors and/or memories that may or may not be stored in the same physical housing. As used herein the terms "process" and/or "processor" and/or "procedure" and/or "subsystem" should be taken broadly to include a variety of electronic hardware and/or software based functions and components. Moreover, a depicted process or processor can be combined with other processes and/or processors or divided into various sub-processes or processors. Such sub-processes and/or sub— processors can be variously combined according to embodiments herein. Likewise, it is expressly contemplated that any function, process, processor and/or subsystem herein can be implemented using electronic hardware, software consisting of a non-transitory computer-readable medium of program instructions, or a combination of hardware and software.

The GPS module 140 can be any type of module capable of identifying GPS coordinates, heading information, speed, velocity, and/or acceleration of the MTS itself.

The radio (not shown) can be mounted to radio mounting location 150. The radio can be any type of radio capable of two-way communication, such as a Silvus SC4200 Radio, TrellisWare Radio, Wave Relay MPU5 Radio. In some examples, the radio can be provided by the user and is considered an optional component of the MTS 100.

The gimbal subsystem 160 can be any type of pan/tilt sub-unit capable of moving the antenna 110. For example, the subsystem 160 can be the PTU-D48 E-Series or PTU-D300 E-Series sold by FLIR®.

The object 180 can be any type of aircraft that is desired to be tracked, such as an airplane, helicopter, unmanned aerial vehicle (UAV), etc.

Figure 2:
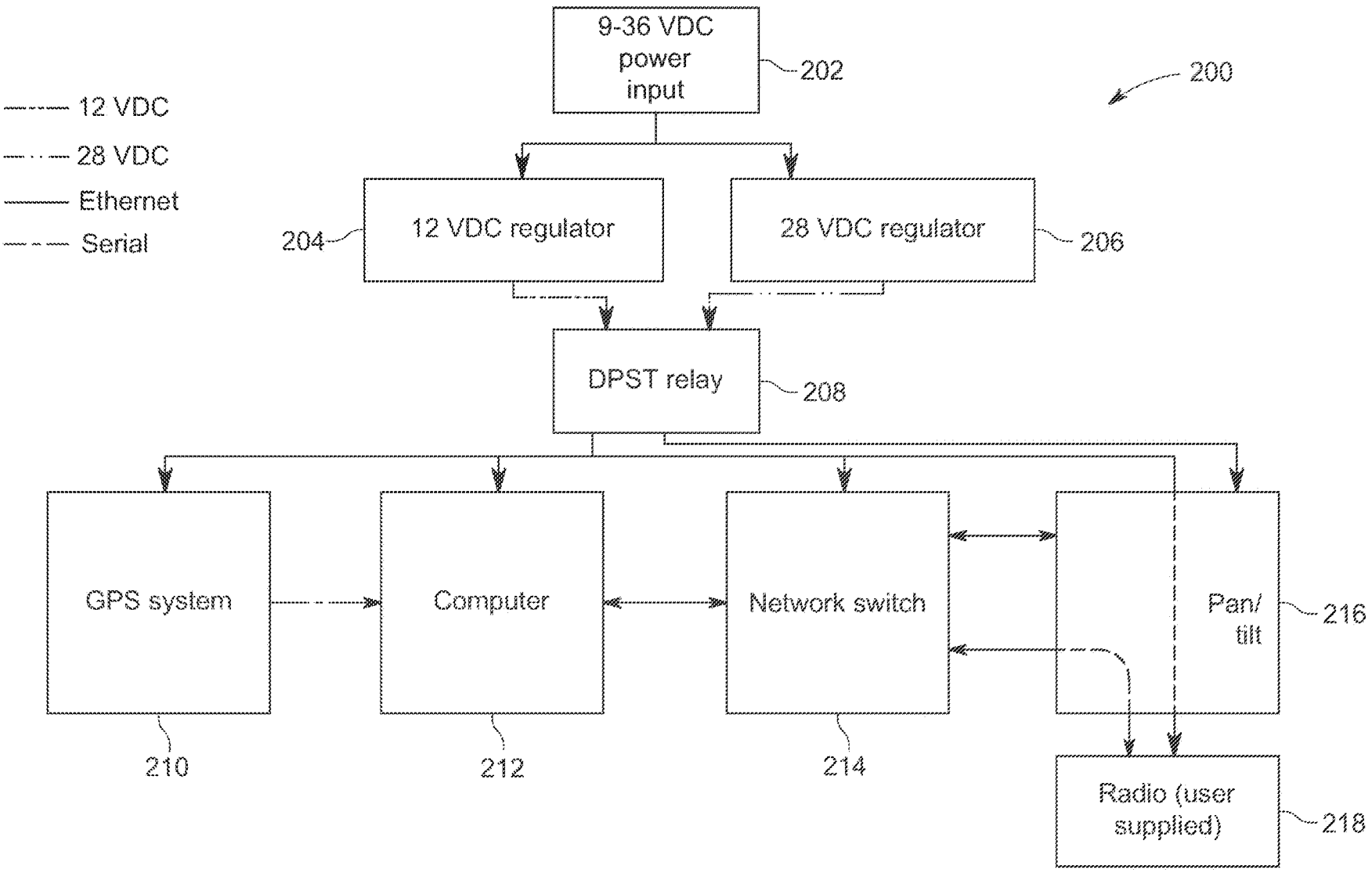
FIG. 2 is a block diagram of a mobile tracking system according to one or more aspects of the disclosure.

FIG. 2 is a block diagram 200 of a mobile tracking system (MTS) 100 according to one or more aspects of the disclosure.

As depicted, the system 100 can receive power from a power input 202, which may or may not be considered part of the overall system 100. The power input 202 can be an AC or DC power input, and in one example can be a 9-36V DC power input. In some examples, the input power can be 12-36 VDC and in one example, can be 30 VDC.

The system 100 can include one or more voltage regulators 204, 206, with regulator 204 being a 12 VDC regulator and regulator 206 being a 28 VCD regulator. The regulators 204 and 206 can respectively connect to a double pole single throw (DPST) relay 208, which can provide power to one or more components of the system, such as GPS system 210 (e.g., GPS module 140), computer 212 (e.g., main computer 120), network switch 214, pan/tilt module 216, and/or radio 218 (e.g., radio 120).

Figure 3:
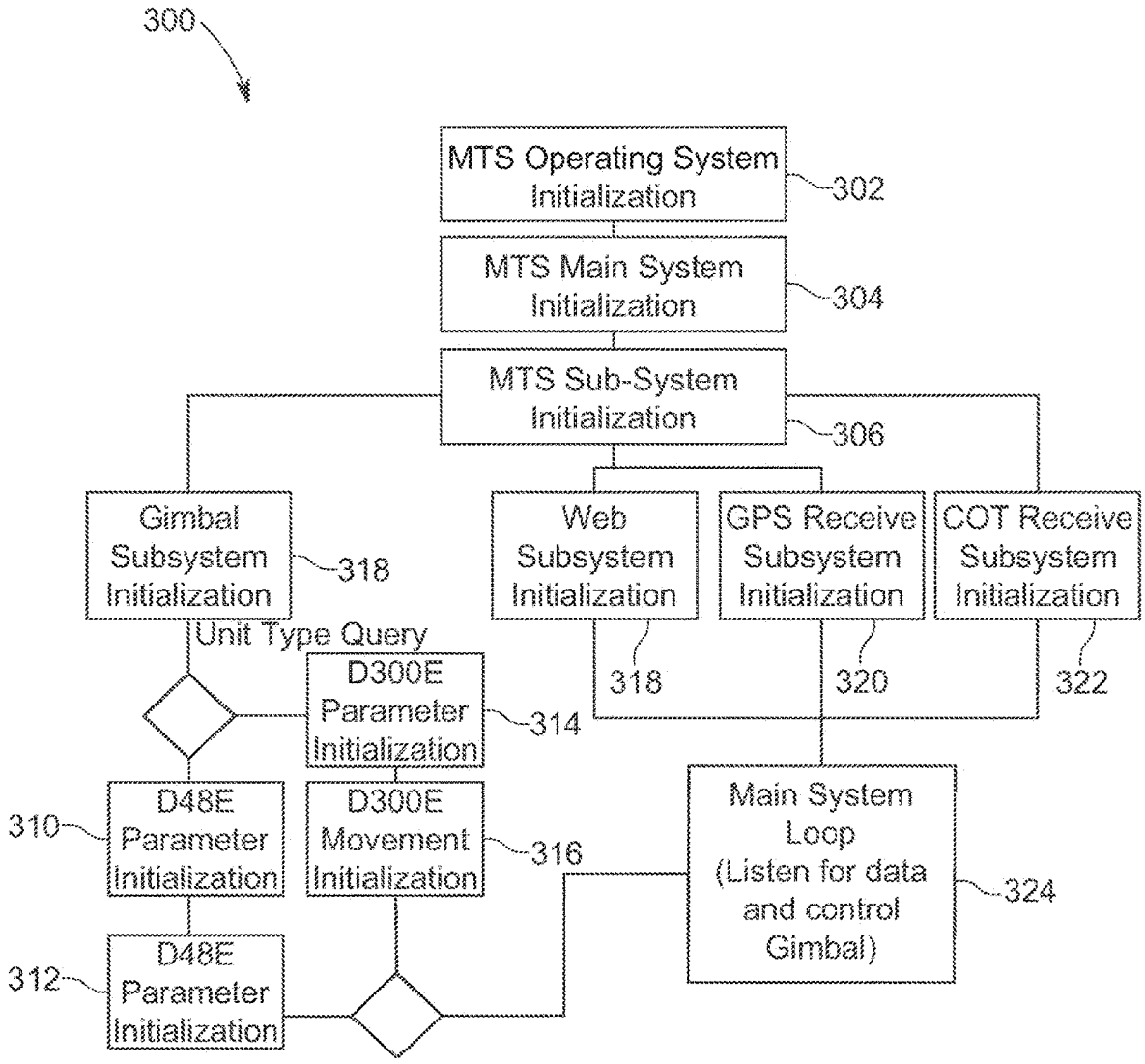
FIG. 3 is a flow chart depicting initialization of one or more subsystems according to one or more aspects of the disclosure.

FIG. 3 is a flow chart 300 depicting initialization of one or more subsystems according to one or more aspects of the disclosure. The processes or procedures depicted in FIG. 3 can be performed or executed by main computer 120.

Block 302 depicts the MTS Operating System (OS) initialization. At this stage, the MTS OS associated with the main computer 120 is initialized.

Block 304 depicts the MTS Main System Initialization. At this stage, the MTS Main System is initialized.

Block 306 depicts the MTS Sub-system initialization, which can occur in one or more stages as described below. In this stage, one or more of the subsystems of the MTS can be initialized, simultaneously or in any time/order sequence.

At block 308 depicts gimbal subsystem initialization. The gimbal subsystem is stored on the main computer 120 and communicates with the gimbal 160, for example one or more of the FLIR D48E and the FLIR D300E. This subsystem communicates with the gimbal 160 over an IP socket.

At this stage, the gimbal control subsystem undergoes an initialization sequence to initialize the settings that are appropriate for the system 100 to operate with the gimbal 160. The MTS firmware (e.g., main computer 120) determines which gimbal device 160 is attached (D48E or D300E), then sets the appropriate speed and acceleration values before doing a short initialization test sequence. The determination of which gimbal device is attached can be via receipt of a data packet from the gimbal 160 including information relating to device/model in response to a unit type query. If the D3003 is present, parameter initialization occurs at 314. If the D48E is present, parameter initialization occurs at 310.

There are several control parameters that are unique to each type of gimbal unit for the MTS to function properly. For example, the D300E is a larger unit designed for lifting a larger antenna unit. This means that there are more positions per degree on the D300E than on the D48E. In this regard, a command from pan/tilt module via gimbal subsystem to pan and/or tilt the antenna 110 via gimbal 160 should be based upon the particular control parameters corresponding to the gimbal 160. For a command to pan by 1 degree would equate to a predetermined number of movement positions for the D300 that is different from the D48E, with the positions for the D300 being greater than the D48E.

Many other parameters can be set appropriately as well to control speed, acceleration, and automatic stabilization. The main computer 120 determines the different parameters required to move the antenna 120 the same physical degrees, both horizontal and vertical, despite the different physical sizes of the units.

At 312 or 316, movement initialization can occur. In this regard, a command is issued to the gimbal 160 to pan and/or tilt. If such movement is successful, then the gimbal control subsystem can continue to the main system loop 324.

After the initialization test is complete, the gimbal control subsystem waits for commands to be received from the main system loop 324. Any time a new tracked node position or initial coordinate position is found, a message is sent to this sub-system to move the gimbal 160 in a manner consistent with the specific gimbal control parameters.

The calculations to determine the position of the gimbal are done in the main program (main thread), so this subsystem need only receive a value for the pan and tilt position. The pan position is a value between −180 degrees to 180 degrees (converted to a position value) that sets the horizontal position.

The tilt position is a value between 0 degrees and −90 degrees. 0 degrees corresponds to a position that is straight up, while a position of −90 degrees corresponds to a position that is level with the ground. The subsystem receives a command and sends the information to the gimbal to move the system.

Block 320 depicts GPS Receiver subsystem initialization. This subsystem receives information from the attached GPS receiver 140 to identify where the MTS is located on earth and its current heading. The subsystem is designed to open a socket to the GPS receiver 140 and receive a NMEA stream. This subsystem then parses out the information from the NMEA stream to determine the latitude, longitude, altitude and heading of the MTS.

This position information is then sent to the main thread 324 and is used to determine where to point the Gimbal 160 as described in the section above. This subsystem parses a standard NMEA stream so if the GPS receive was switched out for another, it should still work assuming the devices follows the NMEA protocol.

Block 322 depicts COT receiver subsystem initialization. This subsystem is designed to receive multicast packets that are sent to a particular address on the network that the MTS system is attached to. For example, the COT Receiver is a procedure executed the main program. It is a sub-system that communicates back to the main thread via a message queue. The MTS firmware can be configured to a multicast address and port. This multicast configuration should be the configuration of the radio attached to the tracked node that is set to send out a COT packets. Since this subsystem is designed to receive information over a multicast address, it most likely will receive COT information from multiple devices on the network. It is designed to store the information from all of the devices, but single out and send information for a particular device (or node) up to the main program. This address can be considered as the IP address of the tracked node.

Once a message is received from the tracked node, this information is sent to the main program and a calculation is done to determine the position of the gimbal. To determine the position, the position of the tracked node plus the position of the MTS via the GPS receiver subsystem should be present.

This position may also be simulated on initialization until the tracked node packet arrives. This is called enabling initial coordinates.

If initial coordinates are enabled, it will point towards the initial coordinate's position until a tracked node COT packet arrives. At that point, the COT packets received by this subsystem will override the initial coordinates until reboot or COT packets from the tracked node stop arriving and initial coordinates options is re-enabled.

Block 318 depicts web server initialization. This subsystem creates a web server where the user can interact with the MTS firmware. This is where settings are configured and the system is managed. In the MTS system, this is a python based web server. Any configuration changes may be done through this subsystem and the API over a websocket plus JSON interface.

Block 324 depicts the main system loop, also referred to as the main program or main thread. This is the main thread where all of the other subsystems are launched and maintained. This main thread handles the interaction among all of the other subsystems. This is also the thread where the actual distance and direction calculations are handled.

The subsystems 318, 320, and 322 generally receive information from both the tracked node (remote node, typically an aircraft), and the MTS position on planet Earth. These subsystems coordinate with the Gimbal control subsystem 308, because the input from both of these coordinate positions determine the physical position for where to orient the dual-axis motor. The physical position will then point the Gimbal and orient the antenna at the aircraft.

The MTS system is designed to work with a plurality of different types of stabilized Gimbal motors. For example, FLIR D48E and the FLIR D300E, also known as a first type and a second type.

The MTS system (e.g., main computer 120) automatically (i.e., without or free of user input) identifies which gimbal motor is attached to the system to determine the type of operations the Gimbal control subsystem must perform; and the appropriate settings needed for calculating the physical direction of the antenna. In this regard, the gimbal 160 type can be swapped within the system 100 without or free of user input. This allows for substitution of gimbal hardware without the need for further input by the user, thus providing easy user operation.

On boot, the MTS software (executed by main computer 120) sends a query message to the Gimbal API. The response to this query is the type of Gimbal motor that is attached to the system. Based on the response to the query message, a set of initialization sequences and parameter configurations is initiated. Those sequences and configurations parameters are unique to the type of Gimbal motor that is attached.

The unit initialization sequence is required because there are several control parameters that are unique to each type of FLIR Gimbal unit for the MTS to function properly. The D300E is a larger unit designed for lifting a larger antenna unit. This means that there are more positions per degree on the D300E than on the D48E. Other parameters that control speed, acceleration, and automatic stabilization must be set appropriately based on which unit the firmware is controlling. The MTS software knows the different parameters required to move the antenna the same physical degrees, both horizontal and vertical, despite the different physical sizes of the units.

Many traditional tracking systems only support a fixed orientation and must remain stationary during operation. In addition to latitude, longitude, and altitude; another parameter for tracking systems to work properly is heading. Which direction the MTS is pointing is factored into the directional calculation. The MTS system advantageously is able to update its heading in real-time. This means that not only can MTS can operate work while stationary, it can also operate on a moving vehicle. This feature allows for movement of both the aircraft and the tracking antenna system for mission operations.

In addition to the system determining its heading automatically, a unique feature of the MTS Gimbal control system is that it is stabilized. This means that if the system moves from being level with the Earth, the MTS Gimbal is able to compensate for these changes and continue pointing the antenna at the same 3D point on Earth. This allows for operation on a moving platform such as a boat or a vehicle in motion. As the orientation changes, the stabilization will compensate to keep the communication link working optimally.

During initialization, there are configuration changes that the MTS firmware loads into the system that also affect the stabilizer. So with the integration of the stabilizer, auto-heading, and new Gimbal motor support, the MTS is world-class tracking antenna system that is ahead of the competition in terms of ease of use, size, weight, and power.

Figure 4:
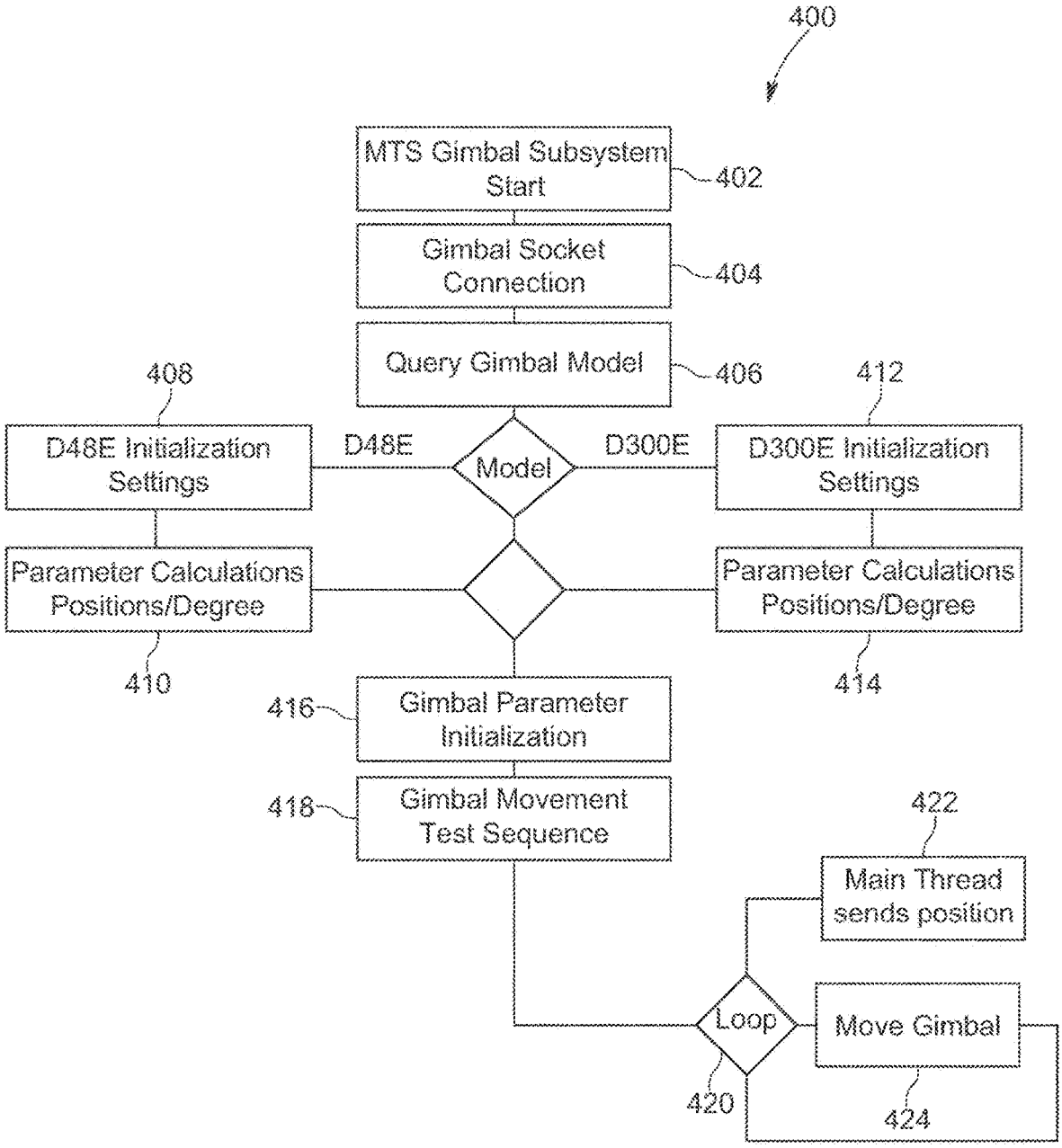
FIG. 4 is a flow chart depicting gimbal subsystem initialization according to one or more aspects of the disclosure.

FIG. 4 is a flow chart 400 depicting gimbal subsystem operation.

At block 402, the gimbal subsystem is started or initialized, and at block 404, a gimbal socket connection is established.

At block 406, a query is made to the gimbal 160 regarding which model is present. At block 408, if the D48E model is present, then initialization settings are set and parameter calculations regarding positions and degree specific to the D48E are conducted at block 410. For example, the speed and acceleration parameters are set based upon the gimbal mode. At block 412, if the D300E is present, then initialization settings are set and parameter calculations regarding position/degree specific to the D300E are conducted at block 412.

At block 416, gimbal parameter initialization is conducted.

At block 418, a gimbal movement test sequence 418 is conducted, with a loop 420 of moving the gimbal 424 and sending the position to the main thread at 422. For example, the gimbal 160 can be moved in one or more directions of up/down, left/right, pan/tilt, etc to confirm operational status of the gimbal.

Figure 5:
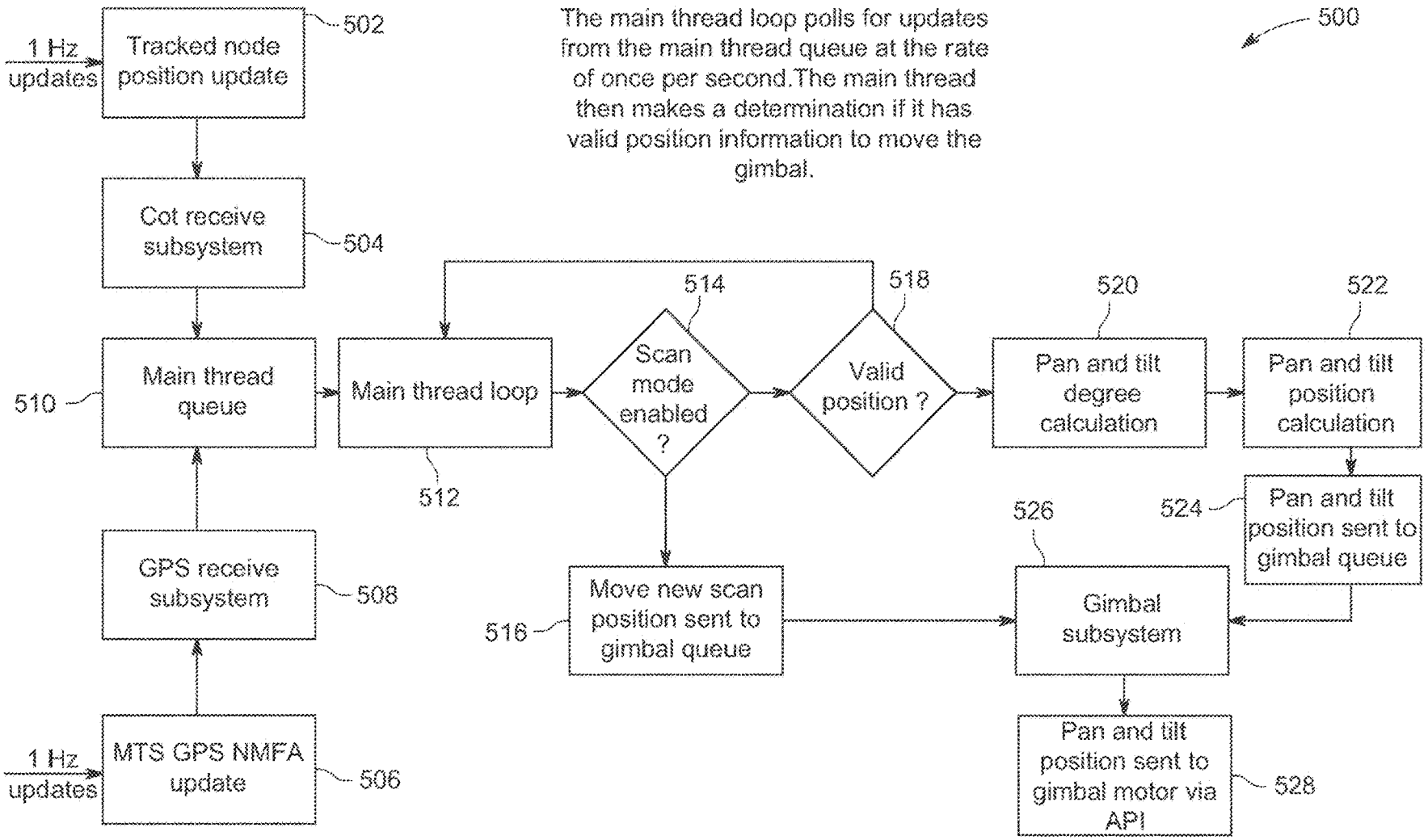
FIG. 5 is a flow chart depicting a scan mode according to one or more aspects of the disclosure.

FIG. 5 is a flow chart 500 depicting the main thread according to one or more aspects of the disclosure.

At block 502, the position of the tracked node (e.g., object 180) is updated from the COT subsystem, which receives position updates of the tracked object 180 from the antenna 110. In one example, position updates can occur at a frequency of 1 Hz. The position information can include current GPS coordinates and heading of the tracked node. At block 506, the position of the MTS system 100 is updated from the GPS subsystem at block 508. In one example, position updates can occur at a frequency of 1 Hz. The position information can include current GPS coordinates and heading of the MTS 100.

At block 510, the position updates are provided to the main thread queue and then to the main thread loop 512, at which point a scan mode 514 is enabled. In scan mode 514, the MTS is searching for a tracked node, such as object 180. If a tracked node is identified, then the process continues to 518. If no tracked node is identified, then a new scan position is sent to gimbal queue at 516, to the gimbal subsystem at 526 and ultimately to the gimbal motor at 528.

At block 518, the position updates of the tracked node and the MTS itself are verified for validity. If both represent valid positions, then the procedure continues to pan and tilt degree calculation 520 and pan and tilt position calculation 522. These calculations are conducted based upon the parameters determined based upon the specific gimbal model installed and also based upon the position information of both MTS and tracked node. In this regard, the MTS 100 can provide movement information to the gimbal subsystem and to the gimbal based upon position/movement of the MTS 100 itself. This provides the advantage that the MTS 100 itself can be moving and the MTS 100 can account for this movement in updating a pan/tilt for the gimbal 160. Thus, the MTS 100 can operate in a stationary or moving environment and still provide accurate information.

At 524, these degree and positions calculations are sent to the gimbal queue 524 and ultimately provided to the gimbal subsystem at 526 and the gimbal motor at 528.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A mobile tracking system, comprising:

an antenna configured to track an object;

a gimbal comprising a gimbal motor and configured to control at least one of a pan or tilt associated with the antenna;

a GPS module configured to identify a position of the mobile tracking system;

a processor configured to determine a model type of the gimbal and, responsive to the determined model type, determine a plurality of gimbal parameters specific to the determined model type, the plurality of gimbal parameters comprising a number of positions per degree associated with a gimbal motor and automatic stabilization parameters;

wherein the antenna is moved, via the gimbal, [at least partially] based on *the processor sending at least one of a pan or tilt position to the gimbal calculated at least partially from mobile tracking system* position information and the plurality of gimbal parameters, *whereby the processor has used a quantity of pan or tilt positions per degree corresponding to the plurality of gimbal parameters for the model type of the gimbal that controls the antenna*; and Cursor on Target (COT) subsystem configured to receive position updates of the tracked object.

2. The system of claim 1, wherein the antenna comprises a dish or satellite dish.

3. The system of claim 1, further comprising a radio.

4. The system of claim 1, wherein the gimbal comprises one of a first gimbal unit or a second gimbal unit, the first gimbal unit having gimbal parameters that are distinct from the second gimbal unit.

5. The system of claim 4, wherein the first gimbal unit or the second gimbal unit can be swapped in the mobile tracking system without further user input.

6. The system of claim 1, further comprising a frame configured to receive at least one of the antenna, gimbal, GPS module, or processor.

7. The system of claim 6, wherein the frame is mounted to a mounting object, comprising at least one of a stationary mounting object or a moving mounting object.

8. The system of claim 1, wherein the object comprises at least one of a helicopter, airplane, or unmanned aerial vehicle.

9. The system of claim 1, wherein the plurality of gimbal parameters comprise control parameters that control speed and acceleration of the gimbal.

10. The system of claim 1, wherein the position updates of the 2 tracked object are received by the COT subsystem at a frequency of 1 Hz.

11. A method of tracking an object using a mobile tracking system, comprising:

receiving a position information for an object to be tracked, comprising at least one of GPS coordinate or heading;

determining position information for the mobile tracking system, comprising at least one of GPS coordinate or heading corresponding to the mobile tracking system;

determining a type of gimbal associated with the mobile tracking system;

determining at least parameter plurality of gimbal parameters corresponding to the determined gimbal type, the plurality of gimbal parameters comprising a number of positions per degree of a gimbal motor and automatic stabilization parameters;

moving an antenna, via the gimbal, based upon the position information for the object, the position information for the mobile tracking system, and the plurality of gimbal parameters; and operating a Cursor on Target (COT) subsystem that receives position updates of the tracked object.

12. The method of claim 11, wherein the gimbal comprises one of a first gimbal unit or a second gimbal unit, the first gimbal unit having gimbal parameters that are distinct from the second gimbal unit.

13. The method of claim 11, wherein the mobile tracking system is mounted to a moving object.

14. The method of claim 12, further comprising swapping the first gimbal unit with the second gimbal unit without further user input to the mobile tracking system.

15. The method of claim 12, wherein the object comprises at least one of a helicopter, airplane, or unmanned aerial vehicle.

* * * * *